(No Model.)
W. H. TAYLOR.
HINGE.
No. 373,620. Patented Nov. 22, 1887.
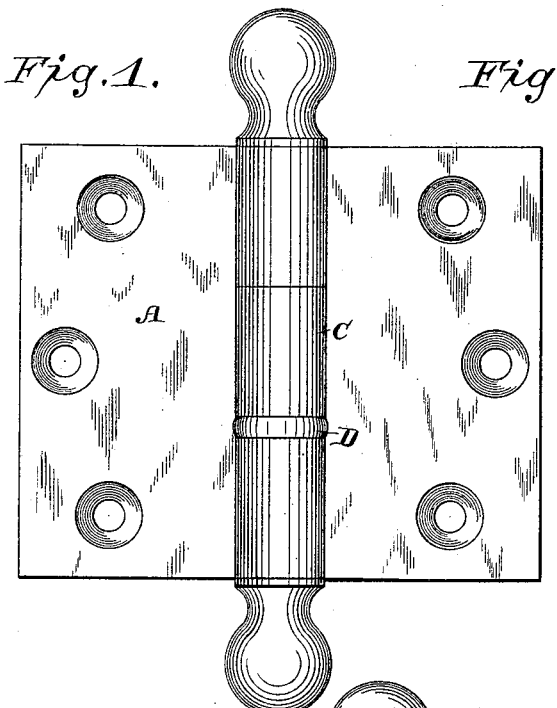
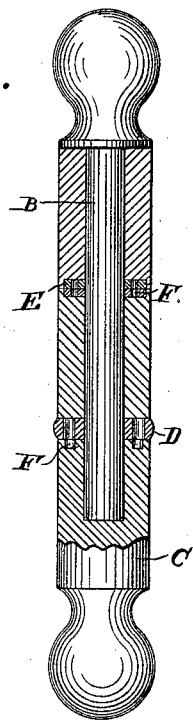
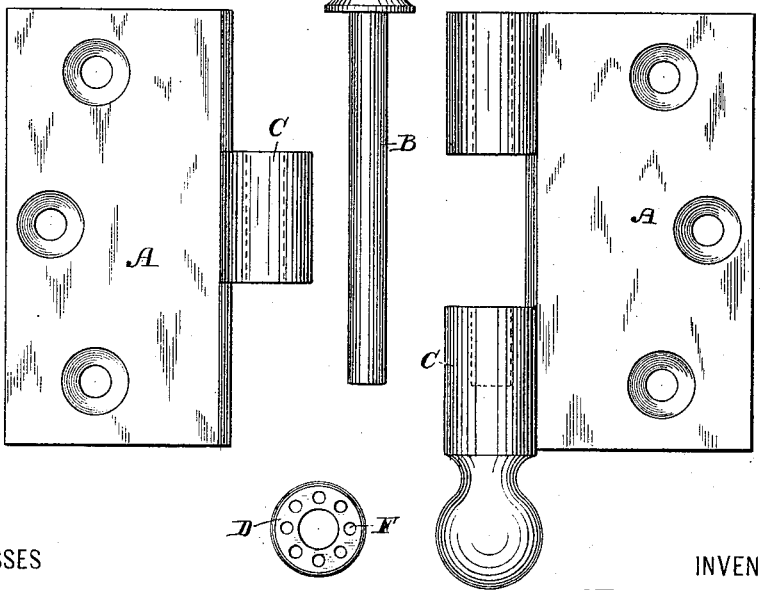
WITNESSES
E. A. Newman,
C. M. Newman
By his Attorneys
Baldwin Hopkins Peyton
INVENTOR
Warren H. Taylor.

UNITED STATES PATENT OFFICE.

WARREN H. TAYLOR, OF STAMFORD, CONNECTICUT, ASSIGNOR TO THE YALE & TOWNE MANUFACTURING COMPANY, OF SAME PLACE.

HINGE.

SPECIFICATION forming part of Letters Patent No. 373,620, dated November 22, 1887.

Application filed August 1, 1887. Serial No. 245,849. (No model.)

*To all whom it may concern:*

Be it known that I, WARREN H. TAYLOR, of Stamford, in the county of Fairfield and State of Connecticut, have invented a certain new and useful Improvement in Hinges, of which the following is a specification, reference being had to the accompanying drawings.

The object of my invention is to provide for continual lubrication of a hinge in use. Ordinarily, after a hinge is placed upon a door little attention is paid to it, and the result is that in a short time there are two perfectly dry surfaces rubbing against each other, which causes rapid wear. In case of a heavy door it is a difficult matter to lubricate the hinges in any ordinary way.

My invention provides means whereby a hinge will be self-lubricating for an indefinite time. I make recesses or pockets in the parts of the hinge knuckles or washers that ordinarily present frictional wearing-surfaces, due to the motion of the parts of the hinges by the opening and closing of doors, which pockets may contain plumbago that will not run or evaporate.

In the accompanying drawings, Figure 1 is a view of an open hinge having my improvements. Fig. 2 is a rear view of the knuckle part of the hinge, partly in section, and Fig. 3 is a view of the parts detached.

Referring to the letters upon the drawings, A indicates a leaf of a hinge, B a hinge-pintle, C the knuckles of the hinge, D an exposed steel washer, and E a concealed steel washer, all in general construction of ordinary character.

Referring to my improvement, F indicates recesses or pockets for containing plumbago. These may be, as shown, in the frictional wearing-surfaces of the knuckles, or in a washer or washers, and they may be of any desired number. When the parts of the hinge are put together and these pockets are filled with a suitable solid or plastic lubricant, the pockets will be covered and concealed, and the surfaces that move in contact with each other will be lubricated and wear in large measure prevented; but should any wear occur in the course of time the lubricant will still continue to perform its function. Thus the disagreeable noise of creaking hinges will be prevented, the life of the hinges thus lubricated will be very greatly prolonged, there will be no necessity to remove doors and take hinges apart for the purpose of lubrication, and there will be no danger of the lubricant getting out of place and doing damage, as in cases where liquid lubricant is used.

My improved hinges can have their pockets filled with lubricant at the place of manufacture, so as to be sent out for use in perfect condition without danger of the lubricant escaping or doing damage.

Having described my invention, what I claim to be new, and desire to secure by Letters Patent of the United States, is—

In combination with a hinge, a perforated washer inserted between the hinge-knuckles, and its perforations filled with a hard lubricant, substantially as set forth.

In testimony whereof I have hereunto subscribed my name.

WARREN H. TAYLOR.

Witnesses:
 SCHUYLER MERRITT,
 GEO. E. WHITE.